2,875,163

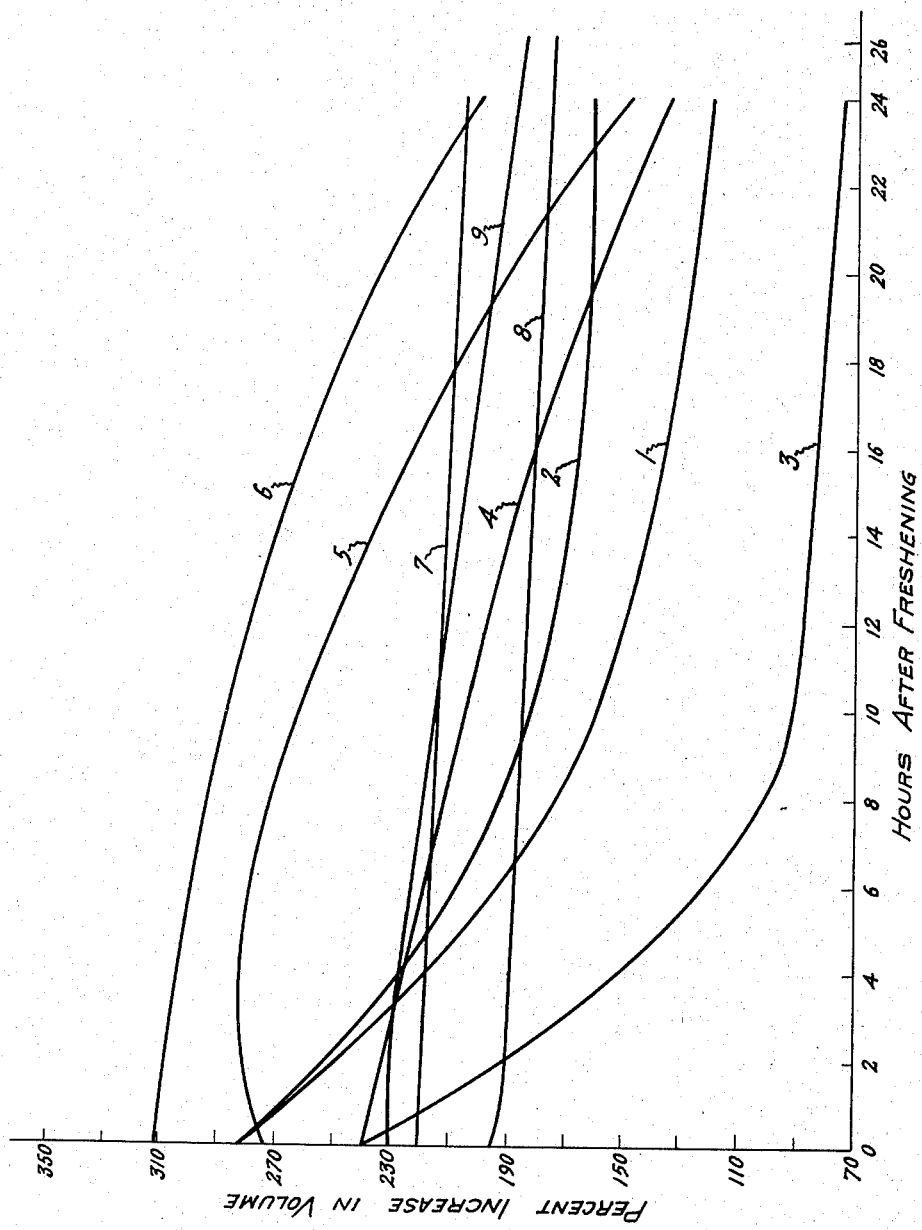

PREPARATION OF SPONGE RUBBER FROM HIGH TEMPERATURE MIXED SILICONE RUBBER-SILICA COMPOSITION

Charles A. Berridge, Cohoes, N. Y., assignor to General Electric Company, a corporation of New York Application November 1, 1956, Serial No. 619,848

7 Claims. (Cl. 260—2.5)

My invention relates to new and improved silicone rubber sponge and to the method of making thereof. It relates also to improved unblown silicone rubbers of the type described.

While the making of sponge silicone rubbers has been known for some time, the preparation of such sponge from silicone rubber compounds or organopolysiloxanes containing silica type reinforcing fillers which are convertible as by heat to the solid, elastic state has been accompanied by resistance to cell formation. This resistance to cell formation or sponging is attributable to the stiffening of the polymer-filler combination sometimes known as structure and is believed to be due to bonding forces between the polymer and filler. While this so-called structure may be temporarily removed by physical working as on a rubber mill to produce a freshened material, the working time of the freshened material or the period over which it may be effectively sponged is relatively short because of the recurrence of structure. Even known silica type fillers intended particularly to reduce structure in ordinary silicone rubber materials have proved incapable of eliminating the structure which resists the blowing or sponging of the rubber. This is true even of silicone rubber compounds which after freshing to reduce structure have zero knit time or immediately cohere in a unitary mass when worked on a rubber mill.

It will be seen then that a need exists for means of efficiently producing spongeable silicone rubber having silica type reinforcing agents and for prolonging the working time or period over which such silicone rubbers may be sponged to a suitable degree.

An object of my invention is to provide an improved method for producing sponge silicone rubbers and to the product resulting therefrom.

Another object of the invention is to produce maximum sponging or expansion for a given amount of blowing agent.

A further object is to provide silicone rubber compounds which retain their sponging ability over prolonged periods of time.

Briefly stated, my invention comprises spongeable silicone rubbers and their production by treating the silica reinforced silicone rubber compound before curing or blowing at elevated temperatures while subjecting the compound to a shearing and smearing or wiping mixing action. Such mixing can typically be obtained in a doughmixer, a mixer of the Banbury type or a mixer having a similar action.

Those features of my invention which I believe to be novel are set forth with particularity in the claims appended hereto. My invention will, however, be better understood from a consideration of the following description and the drawing in which the single figure shows a plot of the percent increase in volume versus hours after freshening for various silicone rubber compounds.

The silicone sponge rubbers of my invention are prepared from organopolysiloxanes and derivatives and modifications thereof which are well known in the art. They are described, for example, in Patents 2,448,756 and 2,448,565, both assigned to the same assignee as the present invention. As set forth in the prior art, such organopolysiloxanes are typically prepared by the hydrolysis of organochlorosilanes to produce organopolysiloxanes consisting of organic groups and silicon and oxygen atoms and having an organic group to silicon ratio which averages from about 1.98 to 2.005. The organic group may be methyl, ethyl, phenyl, chlorophenyl, benzyl, tolyl, xylyl or combinations thereof with at least about 90% of the organic groups being methyl. Any of the finely divided silicas compatible with silicone material can be used in connection with the invention, including but not limited to Cab-O-Sil, a fumed, finely divided silica produced by the Godfrey L. Cabot Company; Cab-O-Sil 2491, produced by the same company, silica aerogel (e. g., Santocel produced by Monsanto Chemical Company); Hi-Sil X303, a finely divided precipitated silica made by Columbia-Southern Chemical Corporation; diatomaceous earth, such as Celite Superfloss made by Johns-Manville, etc. In addition to the silica filler, other fillers or pigments can be used to color or modify the final product as desired.

The curing catalysts used in conjunction with the invention are those known generally to those in the art, namely, tertiary butyl perbenzoate, benzoyl peroxide, tertiary butyl peroxide, bis(2,4-dichlorobenzoyl) peroxide, etc. The blowing or expanding agents are also known in the art and are typified by dinitrosopentamethylenetetramine made by DuPont under the name Unicel ND and N,N'-dimethyl-N,N'-dinitroso terephthalamide sold by DuPont as BL-353.

In carrying out the invention, the convertible organopolysiloxane compound is typically compounded as on a two-roll rubber mill with the silica type filler. The compounded material is then placed in a mixer such as a doughmixer or Banbury type mixer which has a shearing and a smearing or wiping action and mixed for at least about one hour at temperatures varying from about 90° C. up to the temperature at which thermal decomposition of the silicone material begins. Preferably, as a matter of convenience, the temperature of mixing ranges from about 135° C. to about 150° C., although it should be at least 90° C. Alternatively, of course, the material may be compounded as well as mixed and heated in the mixer. The material so treated is then catalyzed and blown to sponge form.

The following examples will illustrate the efficacy of my invention and its decided improvement over the prior art. All parts are by weight.

An organopolysiloxane copolymer was prepared by mixing together about 95 mol percent octamethylcyclotetrapolysiloxane and about 5 mol percent octaphenylcyclotetrasiloxane at a temperature of from 150° C. to 175° C. for about four hours with about 0.01% potassium hydroxide based on the weight of the siloxane until a highly viscous, gummy solid, hereinafter referred to as the copolymer, was obtained.

A material consisting of 100 parts of the above copolymer of octamethylcyclotetrasiloxane and octaphenylcyclotetrasiloxane, 40 parts finely divided precipitated silica and 5 parts of titanium dioxide pigment was compounded on a two-roll rubber mill. The compounded material was sheeted from the mill in 80 mil sheets and placed in a circulating hot air oven at various temperatures and for various times as noted in Table I below:

TABLE I

| Example | 1 | 2 | 3 | 4 |
|---|---|---|---|---|
| Hours | 2 | 20 | 15 | 17 |
| Temperature, °C | 231 | 231 | 150 | 150 |

After baking, there were added to 100 parts by weight of the copolymer, 2.7 parts of tertiary butyl peroxide, 1.3 parts bis(2,4-dichlorobenzoyl) peroxide and 2%, by weight, of N,N'-dimethyl-N,N'-dinitroso terephthalamide based on the catalyzed copolymer weight. The expansion during the sponging or blowing process was measured as percent increase in volume, the samples being free blown at 150° C. at increasing time intervals after compounding or freshening. The percent volume increase versus time in hours after freshening at which samples were blown or expanded are shown in the drawing, the curve for each example being correspondingly numbered except as otherwise noted. Example 4 is the same as Example 3 except that this material was remilled and rebaked at 150° C. for 17 hours.

Example 5

A part of the compounded and unbaked material of Example 1 was mixed in a doughmixer for 15 hours at 150° C. The material was then catalyzed, blowing agent added, and free blown as in Examples 1 through 4 as various times after freshening, with the result shown in curve 5 of the drawing.

Example 6

A material consisitng of 97 parts of the above referred to copolymer, 40 parts finely divided precipitated silica, and 15 parts titanium dioxide was compounded by adding the other ingredients to the heated copolymer in a doughmixer at 140° C. to 150° C. and mixing for 15 hours. When catalyzed and blown to sponge at various times after freshening, the results were as shown in curve 6 of the drawing.

Example 7

A material consisting of 100 parts of the above copolymer, 35 parts finely divided silica, 10 parts titanium dioxide and about 3 parts of diphenylsilanediol were compounded in a rubber mill and doughmixed for 15 hours at a temperature ranging from 150° C. to 160° C. The diphenylsilanediol was added as a structure control agent to lengthen the time to structure build-up or stiffening after freshening. The use of diphenylsilanediol for this purpose is more fully set forth in copending application of Wormuth et al., Serial No. 399,148, filed December 18, 1953, assigned to the same assignee as this invention. The free blown expansion at various times after freshening is shown by curve 7.

Example 8

A composition consisting of 97 parts of the above copolymer and 3 parts of the diphenylsilanediol along with 35 parts finely divided silica such as Cab-O-Sil 2491 having a very high surface area and 10 parts titanium dioxide were doughmixed at 150° C. to 160° C. for two hours. When free blown as above, this composition had expansion ratios comparable to those shown in curve 7.

Example 9

A composition consisting of 97 parts of the above copolymer and 3 parts of diphenylsilanediol along with 35 parts finely divided silica and 10 parts titanium dioxide were doughmixed at 150° C. for two hours. When free blown using 2.7 parts tertiary butyl perbenzoate and 1.3 parts bis(2,4-dichlorobenzoyl) peroxide as catalyst with 2 percent, by weight, of N,N'-dimethyl-N,N'-dinitroso terephthalamide, the percent increase in volume at various times after freshening was as shown in curve 8.

Example 10

A composition consisting of 97 parts of the above copolymer and 3 parts of diphenylsilanediol along with 35 parts of finely divided silica and 5 parts diatomaceous earth were doughmixed for two hours at 150° C. and catalyzed and free blown in similar fashion to Example 9 with the percent increase in volume shown in curve 9.

Perusal of the drawing will at once make evident the advantages of my invention. Referring to Examples 1 through 4 in which the compositions were merely baked after milling or, as in the case of Example 4, remilled and rebaked, the corresponding 1 through 4, respectively, show a decided drop in the percent increase in volume when sponged or blown at times as shown after remilling, reworking or freshening. For instance, Examples 1 and 2 show decreases in percent expansion of 115 percent and 93 percent, respectively, at 8 hours after freshening. It should be noted that the fact that the composition of Example 2 was baked for 20 hours as compared to only two hours for Example 1 produced only a 40 percent increase in expansion at 8 hours after freshening. The material of curve 3 baked at 150° C. showed an even greater drop in expansibility. Remilling and rebaking the rubber compound of Example 3 produced some improvement over other baked compounds, as will be evident from curve 4.

Curve 5 corresponding to Example 5 relates to the composition of Example 1 which, however, was doughmixed for 15 hours at 150° C. From more than a 275 percent increase in volume when blown immediately after mixing according to the present invention, the increase in volume decreased little or not at all when blown 8 hours after mixing or freshening.

Curve 6 again shows the improvement which can be attained by the practice of this invention. Starting at a volume increase of about 310 percent when blown immediately after mixing, the volume increase upon blowing 8 hours after freshening was still about 292 percent. Curve 7 corresponding to Example 7, while it shows an initial volume increase of only about 220 percent, remains substantially the same as to its expansion even 24 hours after freshening.

Curves 8 and 9 are in general similar to curve 7 in their flatness, showing little reduction in percent expansion even up to 26 hours after freshening.

It has been found by experiment that while the rubber compositions can be heated and mixed for any length of time desired, the optimum time is about one hour with decreasing additional benefit accruing after that period. It has also been found that preferably the compositions should be heated and mixed at a temperature of from about 135° C. to about 150° C. While lower temperatures can be used down to about 90° C., the time of treatment necessary becomes quite long. Likewise, higher temperatures up to about the decomposition temperature can be used for shorter periods.

Silicone rubber compositions made according to the invention can be stored before blowing for long periods of time of six months and upward when they may be freshened by reworking on a rubber mill and blown to substantially the same volume as when initially treated up to 8 hours and more after freshening. This feature gives to the fabricator an added safety factor and greater flexibility in producing fabricated silicone sponge products. The expansion, as in other silicone rubber compounds, can be varied by altering the amount of curing agent or blowing agent or both.

The products of this invention, besides having a large blown volume, are characterized by a tough resilient skin and cell wall structure. At an expansion of 250 percent they typically have a tensile strength of 250 pounds per square inch. These sponge products, which are resistant to temperatures up to their thermal decomposition point, are useful in all applications where sponge rubbers are utilized, such as engine mounts, door seals and sealing strips, resilient pads and in many other applications.

Convertible organopolysiloxane or silicone rubber materials treated according to this invention are characterized by improved physical characteristics even when not blown or expanded. For example, when the catalyzed but unblown material of Example 9 was press cured in an ASTM rubber mold for 15 minutes at 150° C. followed by heating for 24 hours at 150° C. and aged for 66 days, the Shore A hardness was 45, the tensile strength 818 pounds per square inch, the elongation 260 percent and the tear strength 60 pound-inches.

When the catalyzed material of Example 10 without blowing agent was press cured as above and heated for 24 hours at 150° C., the physical characteristics were as noted in Table II below after aging for the time noted.

TABLE II

| Days Aging | 6 | 30 | 58 | 84 | 157 |
|---|---|---|---|---|---|
| Hardness, Shore A | 46 | 50 | 51 | 46 | 45 |
| Tensile Strength (p. s. i.) | 975 | 1,076 | 927 | 875 | 713 |
| Elongation (percent) | 320 | 260 | 210 | 220 | 230 |
| Tear (pounds/inch) | 78 | 70 | 52 | 44 | 50 |

When the catalyzed material of Example 10 was press cured as above without blowing agent and heated for 24 hours at 250° C., the various physicals were as noted in Table III below after aging for the times noted.

TABLE III

| Days Aging | 6 | 30 | 58 | 84 | 157 |
|---|---|---|---|---|---|
| Hardness, Shore A | 50 | 50 | 51 | 49 | 44 |
| Tensile Strength (p. s. i.) | 754 | 814 | 780 | 822 | 667 |
| Elongation (percent) | 180 | 180 | 140 | 170 | 220 |
| Tear (pounds/inch) | 47 | 46 | 41 | 42 | 49 |

While I have described my invention in conjunction with certain materials and procedures, it will be realized that these materials and procedures may be varied without departing from the crux of the invention which is the subjection of the convertible organopolysiloxane silicone rubber compound under heat to a mixing action as described. The various fillers and additives can be varied to give products of different physical characteristics. For example, the curing agent may be varied from about 2 to 4 percent of the filled copolymer. Referring to the composition of Example 9, the diphenyl silanediol mixture may be varied from 2 to 4 parts, the silica filler from 30 to 55 parts, the diatomaceous earth from 0 to 20 parts and the titanium dioxide from 0 to 10 parts. In Example 10 the basic composition may be varied in like manner. Likewise, the mol percent of octaphenylcyclotetrasiloxane which is preferably 5 mol percent of the octamethylcyclotetrasiloxane can be used in proportions up to 20 mol percent. Other variations which do not depart from the spirit of the invention will occur to those skilled in the art.

What I claim as new and desire to secure by Letters Patent of the United States is:

1. The process of improving the physical characteristics of cured organopolysiloxane containing from about 1.98 to 2.005 organic groups per silicon atom, at least 90 percent of said organic groups being methyl groups, any other organic groups present being selected from the class consisting of ethyl, phenyl, chlorophenyl and benzyl groups and mixtures thereof, said organopolysiloxane having a filler containing finely divided silica, which process comprises mixing said filled organopolysiloxane in the uncured state at a temperature of at least about 135° C. to 160° C. for at least one hour, said mixing having a shearing and smearing action.

2. The organopolysiloxane produced by the process of claim 1 above.

3. The process of improving the physical characteristics of cured methylphenylpolysiloxane containing from about 1.98 to 2.005 organic groups per silicon atom at least 90 percent of said organic groups being methyl groups, said methylphenylpolysiloxane having a filler containing finely divided silica, which process comprises mixing said filled organopolysiloxane in the uncured state at a temperature of at least 135° C. to 160° C. for at least one hour, said mixing having a shearing and smearing action.

4. The organopolysiloxane produced by the process of claim 3 above.

5. The process of making an expanded sponge silicone rubber which comprises (1) mixing a methylphenylpolysiloxane material filled with a filler containing finely divided silica and containing from about 1.98 to 2.005 organic groups per silicon atom, at least 90 percent of said organic groups being methyl groups, at a temperature of at least 135° C. to 160° C. for at least one hour, said mixing having a shearing and wiping action, (2) adding an organic peroxide curing agent for said organopolysiloxane and an organic nitrogen containing organic blowing agent for said organopolysiloxane selected from the group consisting of dinitrosopentamethylenetetramine and N,N'-dimethyl-N,N'-dinitrosoterephthalamide, and (3) treating said material with heat sufficient to cause expansion and cure.

6. The process of making an expanded sponge silicone rubber which comprises (1) mixing a convertible organopolysiloxane having a filler containing finely divided silica and having from about 1.98 to 2.005 organic groups per silicon atom, at least 90 percent of said organic groups being methyl groups, any other organic groups present being selected from the class consisting of ethyl, phenyl, chlorophenyl and benzyl groups and mixtures thereof, at a temperature of at least 135° C. to 160° C. for at least one hour with a smearing and shearing action, (2) adding an organic peroxide curing agent for said organopolysiloxane and nitrogen-containing organic blowing agent for said organopolysiloxane selected from the group consisting of dinitrosopentamethylenetetramine and N,N'-dimethyl-N,N'-dinitrosoterephthalamide and (3) treating said material with heat sufficient to cause expansion and cure.

7. The process of making an expanded sponge silicone rubber which comprises (1) mixing an organopolysiloxane material having a filler comprising finely divided silica and containing from about 1.98 to 2.005 organic groups per silicon atom, at least 90 percent of said organic groups being methyl groups, any other organic groups present being selected from the class consisting of ethyl, phenyl, chlorophenyl and benzyl groups and mixtures thereof, at temperatures ranging from about 135° C. to 150° C. for at least one hour, said mixing having a shearing and smearing action, (2) adding organic peroxide curing agent for said organopolysiloxane and a nitrogen-containing organic blowing agent for said organopolysiloxane selected from the group consisting of dinitrosopentamethylenetetramine and N,N'-dimethyl-N,N'-dinitrosoterephthalamide, and (3) treating said material with heat sufficient to cause expansion and curing.

References Cited in the file of this patent

UNITED STATES PATENTS

| 2,568,672 | Warrick | Sept. 18, 1951 |
| 2,757,423 | Wurtz et al. | Aug. 7, 1956 |

OTHER REFERENCES

Pfeifer et al.: "India Rubber World," volume 129, No. 4, January 1954, pages 481–484.